US 8,985,961 B2

(12) United States Patent
Chrzastek et al.

(10) Patent No.: US 8,985,961 B2
(45) Date of Patent: Mar. 24, 2015

(54) TURBOMACHINE ROTOR COMPRISING AN ANTI-WEAR PLUG, AND ANTI-WEAR PLUG

(75) Inventors: Thomas Chrzastek, Bussy Saint Georges (FR); Jean-Bernard Forgue, Montacher-Villegardin (FR); Dominique Gaveau, Boulogne (FR); Patrick Jean-Louis Reghezza, Vaux le Penil (FR); Nicolas Christian Triconnet, Saint Fargeau Ponthierry (FR)

(73) Assignees: SNECMA, Paris (FR); MERSEN France Gennevilliers SAS, Gennevilliers (FR)

( * ) Notice: Subject to any disclaimer, the term of this patent is extended or adjusted under 35 U.S.C. 154(b) by 1007 days.

(21) Appl. No.: 12/936,822

(22) PCT Filed: Apr. 7, 2009

(86) PCT No.: PCT/EP2009/054174
§ 371 (c)(1),
(2), (4) Date: Oct. 7, 2010

(87) PCT Pub. No.: WO2009/124949
PCT Pub. Date: Oct. 15, 2009

(65) Prior Publication Data
US 2011/0033283 A1 Feb. 10, 2011

(30) Foreign Application Priority Data
Apr. 7, 2008 (FR) ...................................... 08 01901

(51) Int. Cl.
*F01D 5/30* (2006.01)
*F04D 29/32* (2006.01)
*F04D 29/08* (2006.01)
*F04D 29/64* (2006.01)

(52) U.S. Cl.
CPC ............ *F04D 29/322* (2013.01); *F01D 5/3007* (2013.01); *F01D 5/3092* (2013.01); *F04D 29/083* (2013.01); *F04D 29/644* (2013.01); *Y02T 50/672* (2013.01); *Y02T 50/673* (2013.01)
USPC ..................................................... 416/220 R

(58) Field of Classification Search
USPC ........ 416/244 A, 220 R; 29/889.21; 411/116, 411/117
See application file for complete search history.

(56) References Cited

U.S. PATENT DOCUMENTS 4,405,285 A * 9/1983 Surdi ....................... 416/220 R
4,483,661 A 11/1984 Manharth et al.

(Continued)

FOREIGN PATENT DOCUMENTS

EP 1 400 698 3/2004
EP 1 873 401 1/2008

OTHER PUBLICATIONS

International Search Report issued Jun. 25, 2009 in PCT/EP09/54174 filed Apr. 7, 2009.

*Primary Examiner* — Edward Look
*Assistant Examiner* — Adam W Brown
(74) *Attorney, Agent, or Firm* — Oblon, Spivak, McClelland, Maier & Neustadt, L.L.P.

(57) ABSTRACT

A turbomachine rotor including a disc including a rim and axial slots machined in the rim for the individual housing of blades, a ring being attached to one face of the rim, the ring being pierced with holes in the axial continuation of the slots, at least some of the holes in the continuation of the slots including a plug. The plug includes a first half-plug made of a first wear-resistant material and a second half-plug made of a second material, one of the two half-plugs bearing on one side of the ring and the other bearing on the other side of the ring and being connected to one another through the hole. The plug is configured to form an anti-wear device.

14 Claims, 3 Drawing Sheets

(56) References Cited

U.S. PATENT DOCUMENTS

| | | | |
|---|---|---|---|
| 6,910,866 B2 * | 6/2005 | Bassot et al. | 416/221 |
| 2004/0126240 A1 | 7/2004 | Bassot et al. | |
| 2008/0003108 A1 | 1/2008 | Forgue et al. | |
| 2008/0050245 A1 * | 2/2008 | Cloarec | 416/97 R |

* cited by examiner

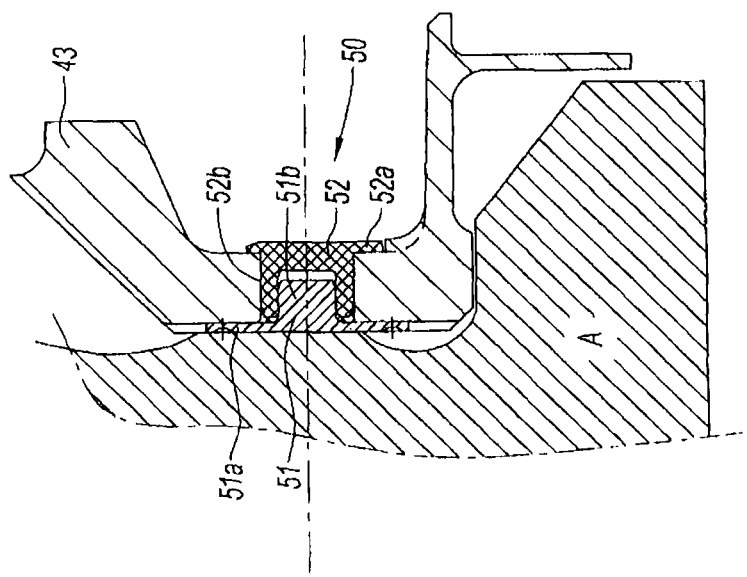
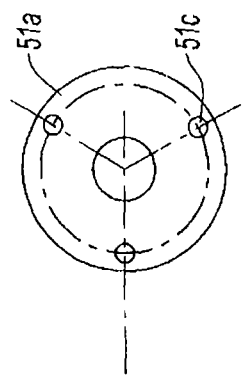
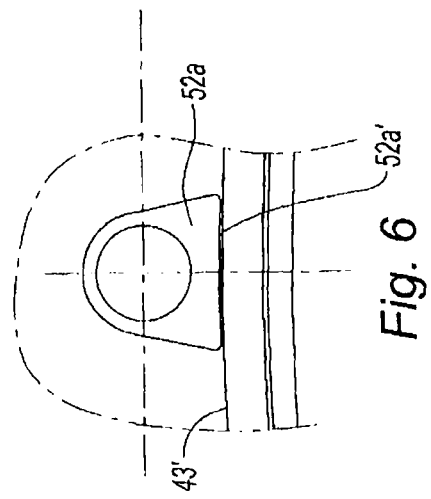

TURBOMACHINE ROTOR COMPRISING AN ANTI-WEAR PLUG, AND ANTI-WEAR PLUG

BACKGROUND OF THE INVENTION

1. Field of the Invention

The present invention relates to the field of gas turbine engines and relates in particular to a turbojet engine having a front fan.

2. Description of the Related Art

The rotor of the turbofan of an engine fitted to civil airplanes comprises a disk driven by the low-pressure shaft. A plurality of blades extend radially from the periphery of the disk, and the blades are held by their end forming the root. In a common type of structure, the blade root has a dovetail cross section and the blades are housed in recesses machined into the rim of the disk in an axial direction. Located immediately downstream of the fan disk and forming the same rotor is the low-pressure compressor. The latter is in the form of a drum and comprises a number of blade stages. The fan disk is secured to the low-pressure compressor drum by being bolted to a radial flange of the latter. The flange is furthermore provided with notches forming a means for axial retention of the blades of the fan disk. Each blade root is provided downstream with an axial extension having two radial grooves and is inserted into a notch at the grooves such that it is locked in the axial direction.

In normal operation, the aerodynamic forces on the blades of the fan have an axial resultant directed upstream. However, when the engine is driven in autorotation, the forces on the blades are reversed. Despite the abovementioned axial locking, there is a clearance and a downstream movement occurs. The downstream transverse edge of the part of the blade forming the shank, between the dovetail root and the platform, then presses against the upstream flange of the low-pressure compressor drum. Wear has been observed on the upstream face of this flange, in the regions located in line with the recesses in the fan disk.

The problem associated with this wear phenomenon results from the presence, in these regions, of drill holes made to relieve the stresses in the flange. The blade that presses against the flange in a drilled region is itself eroded. The wear on the shank is thus not uniform. The surface of the downstream face of the shank is only worn to the extent that it comes into contact with the flange; the surface portion in line with the drill hole is not worn and eventually becomes prominent. This results in undesirable clearances developing between the blades and the flange.

BRIEF SUMMARY OF THE INVENTION

This problem is solved, according to the invention, by a turbomachine rotor comprising a disk having a rim and axial recesses machined on the rim for the individual housing of blades, a ring being attached to one face of the rim, the ring being pierced with holes axially aligned with the recesses, at least some of said holes aligned with the recesses comprising a plug, characterized in that the plug is formed by a first half plug made of a first wear-resistant material and by a second half plug made of a second material, one of the two half plugs pressing against one side of the ring and the other against the other side of the ring and one being linked to the other through the hole.

The plug also seals off with the downstream cavity.

By positioning a plug of wear-resistant material on the recess side, a bearing surface for the blade is created and the wear is thus more uniform. This wear problem is solved very simply with a very low cost component, which is easy to fit. This device can be applied just as easily to new turbomachines as to those already in use.

According to an advantageous embodiment, the first half plug comprises a part in the form of a disk with a collar and a fastener and the second half plug comprises a part in the form of a disk with a collar and a fastener, the two fasteners having complementary forms in order to engage with one another. The fasteners may be, for example, screw fasteners or else be in the form of a clip, the fastener of the first half plug being male and the fastener of the second half plug being female.

The plug is preferably arranged so as not to damage the metal of the drum. Specifically, this involves preventing the formation of any incipient cracks in the course of interventions by an engineer.

Interventions are facilitated by a disk with a collar on the first half plug comprising a drive means for engaging the fastener. This means is formed by markings for positioning a tool for fixing, for example by screwing and unscrewing the first half plug, or else by snap fastening.

Handling is further facilitated with a second half plug comprising a means preventing it from rotating about the axis of its fastener.

Advantageously, the first half plug is made of metal, for example of steel, and the second half plug is made of plastic. Other materials are possible. They can be identical or non-identical.

The invention also relates to a plug arranged to form an anti-wear device.

The invention also relates to a gas turbine engine compressor rotor, comprising a rotor disk having a rim secured to a ring, the rim of the disk having axial recesses for housing blades, the ring at least partially covering the downstream edge of the recesses and having stress-relieving drill holes, some of which are axially aligned with said recesses, and comprising a plug as described hereinabove.

More particularly, the turbomachine rotor disk is a fan disk in a turbojet engine having a front fan fixed to a low-pressure compressor drum. The ring is secured to the compressor drum and the rotor disk is fixed to the drum by being bolted to the ring. The holes are stress-relieving holes.

The invention applies principally to a turbojet engine comprising a front fan and a low-pressure compressor downstream of the fan, wherein the fan disk and the compressor drum form the rotor of the invention.

BRIEF DESCRIPTION OF THE SEVERAL VIEWS OF THE DRAWINGS

Other features and advantages will become apparent from the following description of an embodiment with reference to the appended drawings, in which:

FIG. 4 shows an axial section through a hole in the plug arrangement according to the invention;

FIG. 5 shows the head of the half plug located on the recess side; and

FIG. 6 shows the head of the half plug located on the side opposite the recess side.

DETAILED DESCRIPTION OF THE INVENTION

Figure 1:
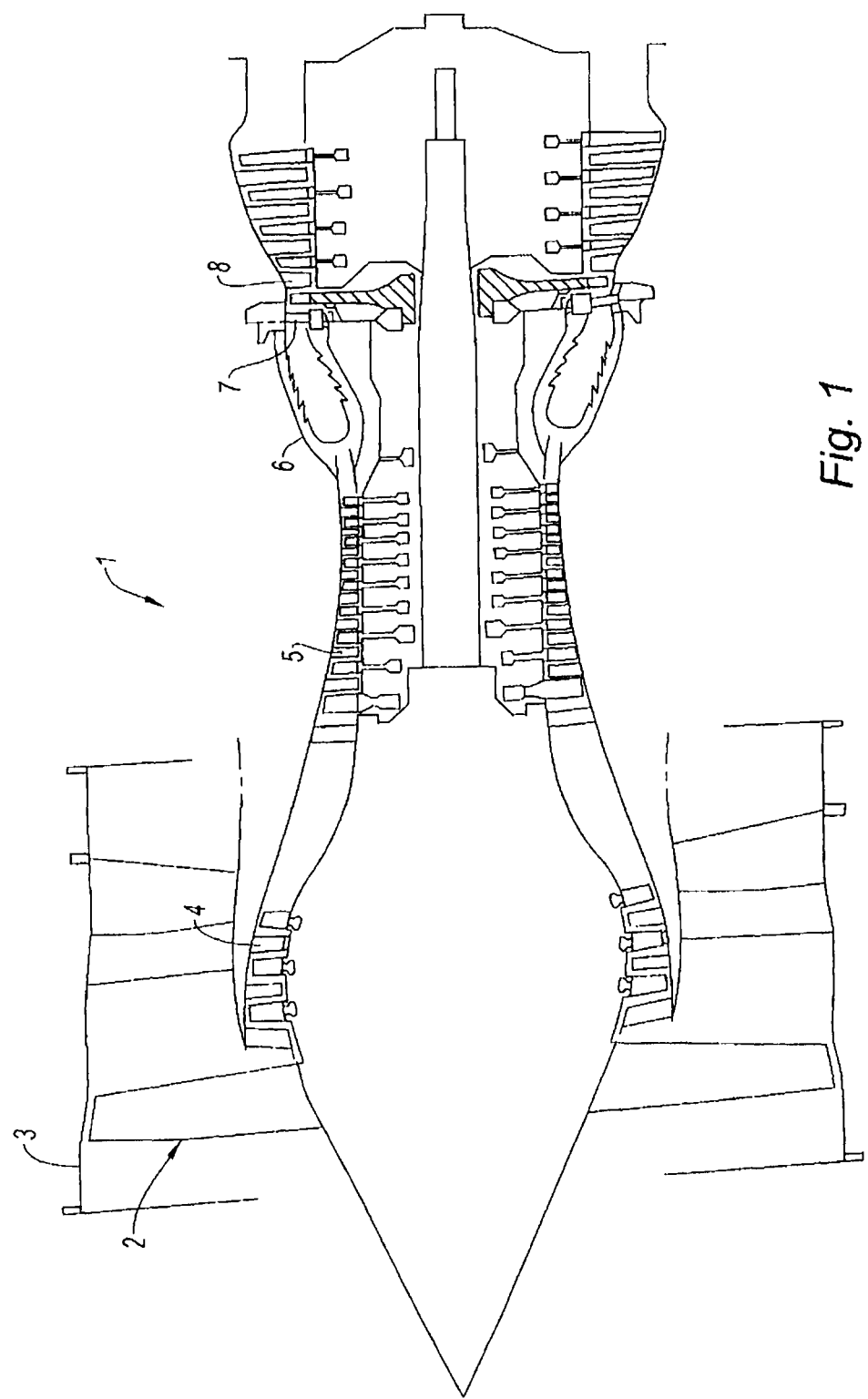
FIG. 1 shows a side view of a turbojet engine to which the anti-wear device of the invention is applied.

FIG. 1 shows a turbojet engine 1 in axial section. It comprises a front fan 2 with a rotor faired into a fan casing 3 which delimits the secondary flow stream. The rotor 2 of the fan is secured to a low-pressure compressor 4. The fan 2 and low-pressure compressor assembly is secured, via a central shaft, to a turbine assembly forming the low-pressure turbine 8.

Downstream of the low-pressure compressor 4, the air is further compressed by the high-pressure compressor 5. The latter is secured in terms of rotation to the high-pressure turbine stage 7 by which it is driven. The compressed air enters the combustion chamber 6 which produces the hot gases for driving the turbine stages.

The invention relates, in this example, to the part of the engine located between the fan rotor 2 and the low-pressure compressor rotor 4.

Figure 2:
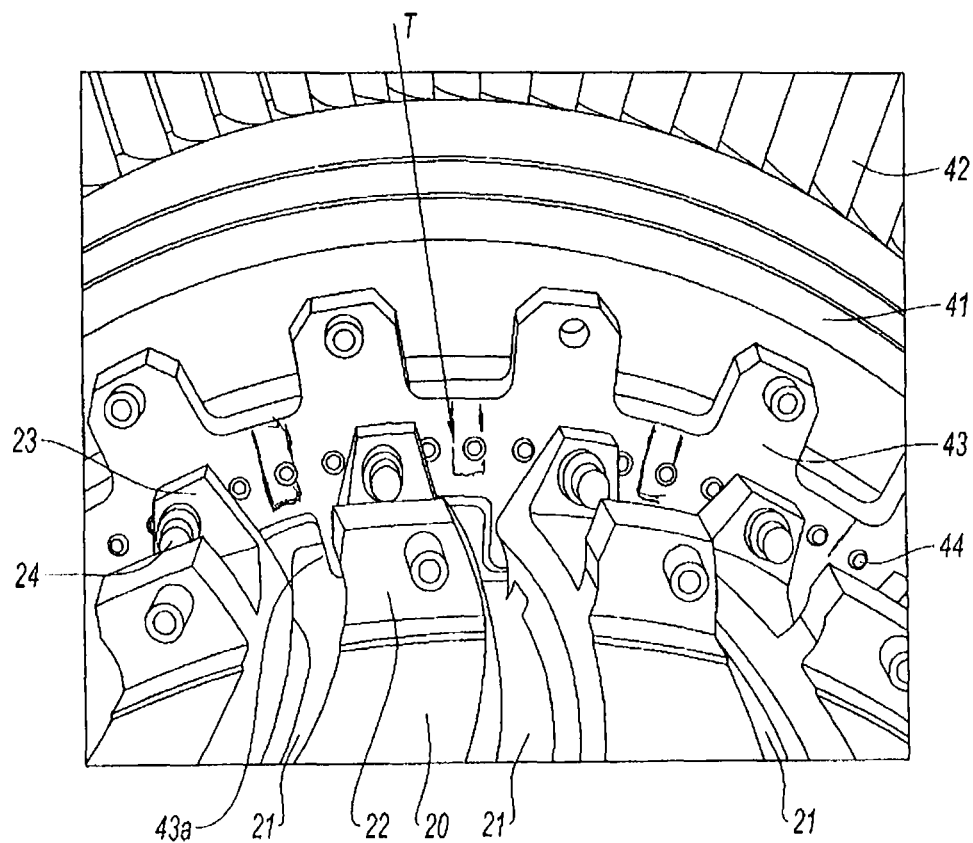
FIG. 2 shows in perspective the detail of a turbojet engine fan rotor on the upstream flange side of the low-pressure compressor.

FIG. 2 shows, in perspective, the inside of this region in which the fan blades have been omitted.

On its rim, the fan disk 20 comprises recesses 21 aligned generally axially, in this case with a curvilinear form. The recesses have a dovetail cross section. The rim comprises radial flanges 22 between the recesses for fixing inter-blade platforms. The disk 20 is secured to the low-pressure compressor 4 located downstream. The compressor comprises a cylindrical drum 41 to which the compressor blades 42, some of which can be seen, are fixed. Upstream, the drum is secured to a radial flange 43 to which the rim of the disk 20 is bolted. The rim comprises radial fixing flanges 23 between the recesses 21. Each radial flange 23 is fixed by a bolt 24 to the upstream flange 43 of the compressor.

The upstream flange 43 has retaining notches 43a which have radial edges and are open toward the machine axis. These notches serve for the axial retention of the blades by introduction of the root of the opposite blade. This manner of retaining the blades is described in the patent EP165860 in the name of the applicant. Between the fixing flanges 23, on a circle of the same diameter, drill holes 44 are made in the upstream flange 43. The function of these drill holes is to relieve the stresses to which this component is subject. Sealing plugs prevent downstream air, inside the drum 41, from escaping upstream, where the pressure is lower. These sealing plugs are made of synthetic material and have no other function.

In operation, the engine can be put into autorotation with reversal of the forces on the blades. In such a case, the downstream face of the blade shank bears against the flange 43. The pressure and the movements of the blades lead to wear both of the blade and the upstream flange. The trace T of wear left by the blade shank on the flange can be seen on this rotor. This trace is aligned with the recesses and overlaps a drill hole 44. Non-homogeneous wear of the shank results, with hollowing of the material around the region which is in the axis of the drill hole.

Figure 3:
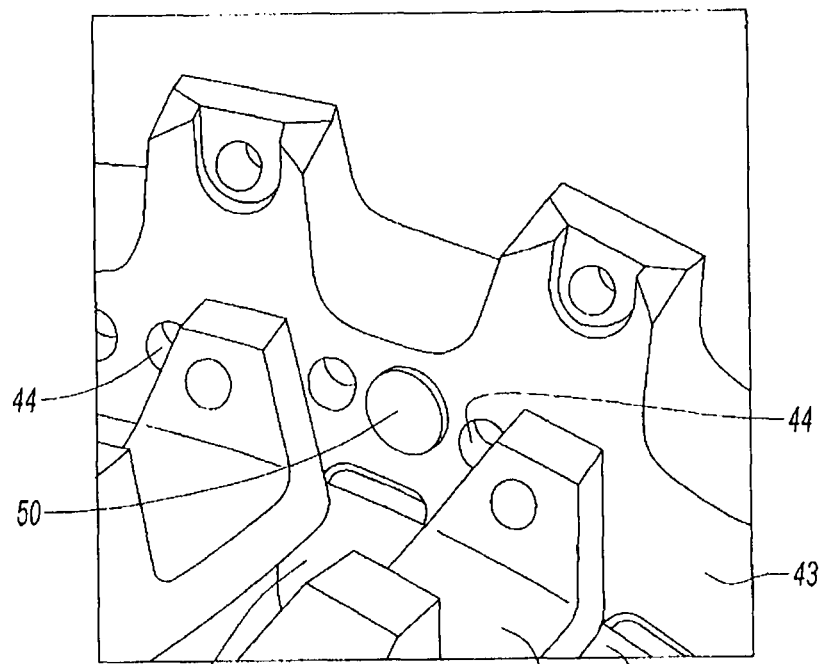
FIG. 3 shows the detail of the flange shown in FIG. 2 with an anti-wear device.

The invention solves this problem by the positioning of an anti-wear plug. FIG. 3 shows the same region of the engine as FIG. 2, likewise without blades. Only part of the fan disk 20 is shown. It is joined to the upstream flange 43 of the downstream low-pressure compressor. The drill hole 44 opposite the recess 21, in alignment therewith, is closed by a plug 50. This plug is arranged so as to form a bearing surface for the blade which is located in this recess but is not shown in the figure.

FIGS. 4, 5 and 6 illustrate the solution of the invention.

The plug 50 comprises two half plugs 51 and 52, one on each side of the drill hole 44. The half plug 51 on the blade A side has a head 51a wider than the diameter of the drill hole. The head 51a is in the form of a disk with a collar. Its surface is flat so as to form a wide bearing surface for the shank of the blade A. The half plug 51 comprises a fastener 51b linking it to the half plug 52. The half plug 51 is made of a wear-resistant material, for example metal.

As can be seen in FIG. 5, which is a front view of the plug 50, the head 51a also has three marks 51c for the introduction of a tool by means of which the half plug can be fastened to the rod, for example by screwing, although other means are also possible.

The half plug 52, which is made of plastic, comprises a head 52a bearing against the opposite face of the upstream flange 43. The head 52a is also in the form of a disk with a collar. The half plug is extended into the drill hole 44 by a fastener 52b which engages with the fastener 51b of the half plug 51 in order to form a link and to keep the two half plugs tightened together on either side of the upstream flange 43. By way of example, the fastener 51b is in the form of a threaded rod engaging by screwing with the female fastener 52b. As can be seen in FIG. 6, which is a front view of the half plug 52, the head 52a has an edge 52a' forming an anti-rotation means by bearing against a step 43' machined onto the upstream flange 43.

The plug is fitted as follows.

In an initial phase during fitting of the engine, the half plug 52 is positioned in the drill hole from inside the drum. The outside diameter of the female fastener 52b enables force fitting of the half plug 52 by introducing the female fastener 52b into the drill hole 44.

The half plug 51 is then positioned from the other side and is fixed with the aid of a three-arm tool in the marks 51c on the head 51a. By extending beyond the drill hole, the head 51a forms a bearing surface sufficient to distribute forces. The strength of the head 51a is also sufficient for the metal not to pass into the drill hole.

When it is necessary to change the plug, all that is necessary is to remove the half plug 51 and leave the other half plug in place. Any problem of accessing the other face of the upstream flange is thus solved.

Thus, a wear problem likely to have very harmful consequences on the safety, cost and performance of the engine has been solved by a particularly simple and inexpensive means.

The invention claimed is:

1. A turbomachine rotor comprising:
a disk including a rim and axial recesses machined on the rim for individual housing of blades;
a ring attached to a downstream face of the rim, the ring being pierced with holes axially aligned with the recesses; and
a plug provided in a hole of the ring which is aligned with and downstream of one of the axial recesses to present a bearing surface for a downstream face of a shank of the blade housed in the one of the axial recesses,
wherein the plug includes a first half plug made of a first wear-resistant material and a second half plug made of a second material, the first half plug pressing against an upstream side of the ring and the second half plug pressing against a downstream side of the ring, the half plugs being linked to the each other through the hole,
wherein the first half plug comprises a head in a form of a disk with a collar and a fastener and the second half plug comprises a head in a form of a disk with a collar and a fastener, the two fasteners having complementary forms to engage with one another, and
wherein the second half plug comprises an anti-rotation device which prevents the second half plug from rotating about an axis of the fastener of the second half plug.

2. The turbomachine rotor as claimed in claim 1, wherein the plug also forms a seal.

3. The turbomachine rotor as claimed in claim 2, wherein at least one of the first half plug is made of metal or the second half plug is made of plastic.

4. The turbomachine rotor as claimed in claim 1, wherein the fastener of the first half plug is male and the fastener of the second half plug is female.

5. The turbomachine rotor as claimed in claim 1, wherein a head of the first half plug includes external markings so as to enable introduction of a tool for fixing the first half plug along the axis of the hole.

6. The turbomachine rotor as claimed in claim 1, wherein the anti-rotation device includes an edge provided on the head of the second half plug which bears against a step provided on the downstream side of the ring.

7. The turbomachine rotor as claimed in claim 1, wherein the fasteners are screw fasteners or snap fasteners.

8. A turbojet engine comprising:

a front fan and a low-pressure compressor drum downstream of the fan, wherein the fan and the low-pressure compressor drum form a rotor as claimed in claim 1, the ring being secured to the compressor drum and the fan being fixed to the drum by being bolted to the ring.

9. The turbomachine rotor as claimed in claim 1, wherein the first half plug is removable from the hole while the second half plug remains in the hole.

10. A plug forming an anti-wear mechanism for a turbomachine rotor, comprising:

a first half plug made of a first wear-resistant material; and a second half plug made of a second material identical to or different than the first, wherein the two half plugs being arranged such that the first half plug presses against an upstream side of a ring and the second half plug presses against a downstream side of the ring, and the half plugs are linked to each other through a hole in the ring, wherein the first half plug comprises a head in a form of a disk with a collar and a fastener and the second half plug comprises a head in a form of a disk with a collar and a fastener, the two fasteners having complementary forms to engage with one another, and wherein the second half plug comprises an anti-rotation device which prevents the second half plug from rotating about an axis of the fastener of the second half plug.

11. The plug as claimed in claim 10, wherein the fasteners are screw fasteners or snap fasteners.

12. The plug as claimed in claim 10, wherein the fastener of the first half plug is male and the fastener of the second half plug is female.

13. The plug as claimed in claim 10, wherein a head of the first half plug includes external markings so as to enable introduction of a tool for fixing the first half plug rotationally about the axis of the hole.

14. The plug as claimed in claim 10, wherein at least one of the first half plug is made of metal or the second half plug is made of plastic.

* * * * *